United States Patent [19]

Alexander

[11] Patent Number: 4,638,418
[45] Date of Patent: Jan. 20, 1987

[54] POWER INVERTER

[75] Inventor: Jonathan W. Alexander, Boaz, Ala.

[73] Assignee: Tocco, Inc., Boaz, Ala.

[21] Appl. No.: 769,246

[22] Filed: Aug. 26, 1985

[51] Int. Cl.<sup>4</sup> .......................... H02P 1/04; H02P 13/20
[52] U.S. Cl. ..................................... 363/49; 219/10.77; 363/37
[58] Field of Search ....................... 363/37, 49, 57, 58, 363/136, 137, 138; 219/10.77

[56] References Cited

U.S. PATENT DOCUMENTS

| | | | |
|---|---|---|---|
| 3,466,528 | 9/1969 | Adams | 321/45 |
| 4,047,092 | 9/1977 | Bendzsak | 363/135 |
| 4,114,010 | 9/1978 | Lewis | 219/10.41 |
| 4,275,438 | 6/1981 | Stirniman | 363/136 |
| 4,385,348 | 5/1983 | Wisner | 363/37 |
| 4,511,956 | 4/1985 | Dewan et al. | 363/49 |

FOREIGN PATENT DOCUMENTS

| | | | |
|---|---|---|---|
| 2530465 | 1/1976 | Fed. Rep. of Germany | |
| 2100078 | 12/1982 | United Kingdom | 363/97 |
| 647816 | 2/1979 | U.S.S.R. | 363/136 |

OTHER PUBLICATIONS

B. R. Pelly, Latest Developments in Static High Frequency Power Source for Induction Heating, IEEE Transactions of IECI, vol. IECI—17, No. 4, pp. 297-312, Jun. 1970.

Zhao, et al., A Thyristor Inverter for Medium Frequency Induction Heating, IEEE Transactions on IAS, vol. IASSI. 38A, pp. 962-965 (Oct. 5-9, 1981).

Primary Examiner—Peter S. Wong
Assistant Examiner—Judson H. Jones
Attorney, Agent, or Firm—Body, Vickers & Daniels

[57] ABSTRACT

A power inverter particularly suited for use in applications requiring serially inductively heating workpieces in a predetermined manner, having a main inverter and an auxiliary starting inverter, in an arrangement in which the starting inverter is selectively applied and removed from the load in predetermined timed relationship with the application of the main inverter across the load, and providing a decrease in the inherent instability of the main inverter operation through an increase in the apparent Q of the load, while adjusting the output of the starting inverter to a value greater than the instability level of the main inverter.

11 Claims, 5 Drawing Figures

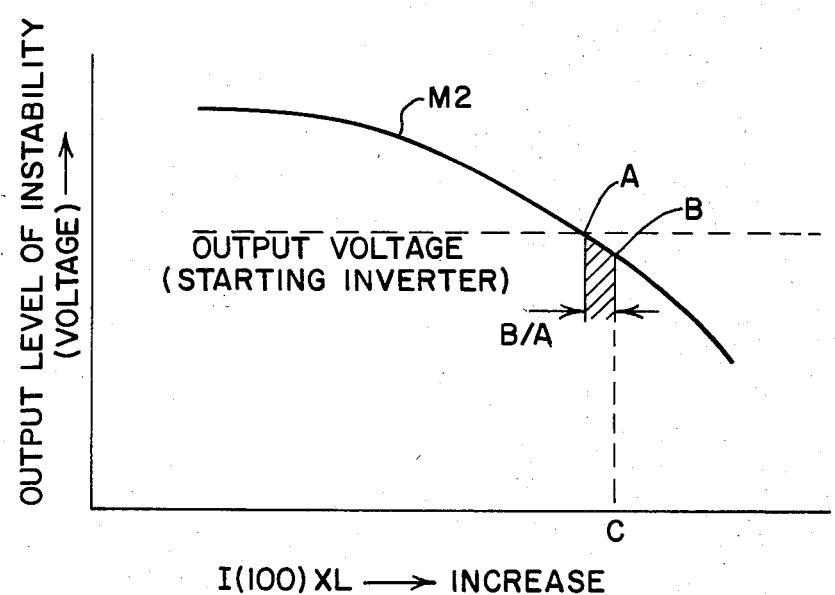

POWER INVERTER

The present invention relates to the art of induction heating and more particularly to an improved power inverter and method of operating the same for use in induction heating or similar environments.

INCORPORATION BY REFERENCE

The present invention relates to an improved inverter and method of operating the same. The following U.S. Patents are incorporated by reference herein: U.S. Pat. Nos. 3,506,907; 3,599,078; 3,657,634; 3,718,852; 3,725,770; 3,757,197; 4,039,926; 4,195,233; and 4,511,956.

BACKGROUND OF THE INVENTION

The invention relates to inverters in general and more particularly to an inverter for induction heating. Such an inverter supplies high frequency alternating current to the induction heating coil which forms a tank circuit that has varying electrical characteristics according to the material and size of the workpiece and the temperature of the workpiece being heated. The load in the induction heating installation has an inductive component, a capacitive component and a resistive component. Consequently, the load is susceptible to frequency changes and presents impedance characteristics to the inverter that vary drastically. In recent years, there has been a substantial amount of work devoted to the development of a high power solid-state power supply for driving an induction heating load. Such devices generally convert direct current to an alternating current which flows through the load. One of the most common of these devices is a solid-state inverter having a constant current supplied from a D.C. source, which current is alternately switched through the load in different directions by two distinct sets of switching devices, generally silicon controlled rectifiers (SCR's). This type of solid-state device has been used in tandem with a power rectifier which converts available three phase alternating current into direct current. This direct current is then directed to the inverter which changes the direct current into a single phase alternating current of a controllable high frequency. Frequency of the inverter is controlled by the rate at which gating signals are provided to the SCR's. One form of such inverter is a current-source, parallel-compensated inverter, well known in the induction heating art.

A particularly advantageous use of such inverters is in sequential induction heating of workpieces in an assembly line fashion. Workpieces to be heat treated may be passed to an appropriately designed induction heating coil driven by a power inverter such as that previously described. For each workpiece to be heated, the inverter is energized to drive the heating coil to heat treat the workpiece in the desired manner.

A problem with such applications of power inverters that is particularly serious when used for varying loads is that the inverter is difficult to start commutating. It is usually impossible to start a power inverter by merely providing gating pulses to the SCR's of the inverter in a manner similar to a steady state condition. At start up, there is no energy in the load for commutating the SCR's. This starting problem is further compounded when the load is spaced from the inverter so that a substantial inductance is created by connecting leads between the inverter and the load. Because of these difficulties, a substantial amount of work has been devoted to providing an arrangement for starting the power inverter used in induction heating. An advantageous arrangement has been described in U.S. Pat. No. 4,511,956. In accordance with this reference, a power inverter is provided, including a starting inverter having a D.C. input and A.C. output, with a frequency controlled by a series of repeating gating commands. An arrangement for selectively applying the A.C. output of the starting inverter across the load is provided with means responsive to the existence of a given energization condition of the load to energize the main power inverter, and remove the auxiliary starting inverter from the load. The auxiliary starting inverter can be a separate and distinct electrical device having relatively small, inexpensive components in comparison with the power inverter and is intended to drive the load at near its resonant frequency at significantly lower output levels than the power inverter operational levels. Thus, the starting inverter may be used to develop a voltage across a load until the load was charged sufficiently to allow commutation of the power inverter SCR's. It has been found that while this device offered improvements over prior starting arrangements, there still remained a percentage of attempts to energize the system when the power inverter failed to start, i.e., commutation was not commenced. It will be appreciated that in serial heating applications, a failure to energize the power inverter will result in a workpiece not being heat treated.

It has been recognized that a power inverter of the type described has an inherent level of output voltage instability, below which level the power inverter is inconsistent at start-up, particularly when the load to be heated has a relatively low Q (below e.g., 6). If the starting inverter output level is below this level of instability, commutation failure may occur when there is an attempted start-up of the power inverter.

THE INVENTION

The disadvantages described above, and others, are overcome by the present invention which is directed to an improved power inverter which can be started consistently and used for heating a large variety of loads, and which finds particular use in the serial heating of a large number of workpieces.

In accordance with the present invention, there is provided an improvement in a power inverter for converting direct current from a constant current supply into alternating current, for use in applications requiring frequent energizations of serial loads having varying Q characteristics, the power inverter including a starting inverter for providing initial energization of each load; the starting inverter having a direct current input from the supply and an alternating current output which may be selectively applied across the load; means responsive to an energization level of the load to remove the starting inverter from the load when a preselected energization level is reached: and means to energize the power inverter in timed relationship with the removal of the starting inverter from the load. The improvement is a provision of an arrangement increasing the system stability irrespective of variations in the Q of the load that is to be energized by the power inverter, thereby decreasing the level of output voltage instability of the power inverter. This is accomplished by changing the Q of the total system so that the Q of the system is always greater than the Q of the load. This gives an apparent load Q that allows system stability. In the preferred embodiment, the system Q or apparent load Q is increased by increasing the input choke to the main power inverter; however, the apparent load Q could be increased by other arrangements at the inverter or at the load. Further, the starting inverter is driven at an increased output level which is greater than the level of the adjusted output voltage instability of the power inverter. In practice, the apparent Q of the system is increased by providing a D.C. choke between the constant current source and the power inverter to decrease the level of voltage instability of the power inverter. It will be recognized that such chokes are extremely expensive, increasing in cost in proportion to their size, and it is desired that this component be as small as possible, consistent with the need to start under a wide variety of conditions. Likewise, the starting inverter is similar to that discussed in U.S. Pat. No. 4,511,956 and is comprised of relatively small, low cost components having an increased power handling capability to enable the starting inverter to have an output energization level of about 10 to 15 percent of the power inverter. In combination, the increase in the system's apparent Q and the increase in the energization output level of the starting inverter allows the power inverter to commutate consistently on start-up, with almost no failures.

While it will be recognized that either a larger D.C. choke or higher starting inverter output level alone would accomplish the sought after result, the cost of such solutions is prohibitive. Both solutions use circuit elements which greatly increase in cost in relation to increase in component value or ratings. Accordingly, a particular advantage of the invention is found in the accommodation in cost resulting from the dual approach.

The primary object of the present invention is the provision of an improved solid state power inverter and method for operating the same, which improved power inverter and method may be used in induction heating, operating over a wide variation of frequencies, and load conditions.

Another object of the present invention is the provision of a power inverter, as defined above, which has inherent operating characteristics allowing consistent start up with the use of a relatively small, inexpensive starting inverter.

Yet another object of the present invention is the provision of a power inverter having a starting inverter arrangement which provides an inherently decreased level of operating instability, and an increase output level, whereby the power inverter commences steady-state operation thereof at a level higher than the uppermost point of the area of instability of the power inverter.

These and other objects and advantages of the present invention will become apparent from the following description used to illustrate a preferred embodiment of the invention as read in connection with the accompanying drawings in which:

FIG. 5 is a graph showing the relationship of output instability to the starting inverter output voltage.

Figure 1:
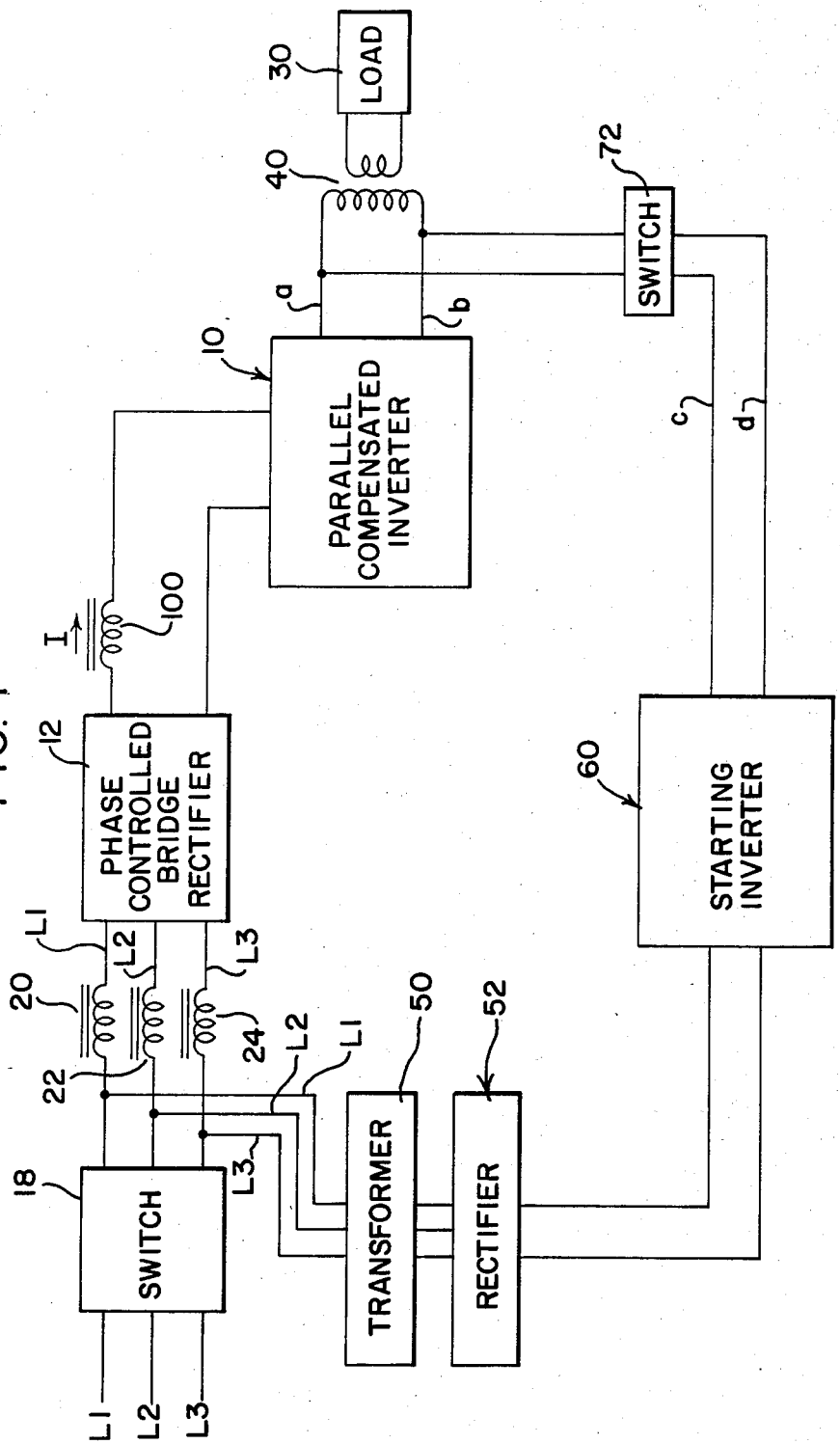
FIG. 1 is a block diagram showing a schematic view of a preferred embodiment of the invention.

Referring now to the drawings, wherein the showings are for the purpose of illustrating a preferred embodiment of the invention only, and not for the purpose of limiting the same, FIG. 1 shows, in block diagram form, an inverter and starting arrangement generally in accordance with U.S. Pat. No. 4,511,956. Parallel compensated or main inverter 10 with outputs a and b is connected to a standard phase controlled bridge rectifier 12. Rectifier 12 has three phase inputs L1, L2 and L3 which may be connected and disconnected from the rectifier 12 by an appropriate circuit breaker or switch network 18. In practice, line reactors 20, 22 and 24 are provided between circuit breaker 18 and phase controlled bridge rectifier 12 to control the di/dt of the line rectified into a constant current D.C. source by bridge rectifier 12. Output lines a and b are connected across induction heating load 30, which is a parallel tuned tank circuit including inductance, resistance, and capacitance as illustrated in FIG. 2, via load transformer 40.

Transformer 50 shown in FIG. 1 connects a second rectifier 52 to the input side of a starting inverter 60. Starting inverter 60 has output leads c and d connectable across the primary of output transformer 40. Starting inverter 60 as described in U.S. Pat. No. 4,511,956 is connectable across the induction heating load 30 by a switch 72. It will be appreciated, as described in the aforementioned patent that switch 72 controls the application of the starting inverter across the load in accordance with a predetermined arrangement, such that the starting inverter 60 is applied to and removed from the load 30 in predetermined timed relationship with the start-up of the power inverter 10, as determined by the condition of the load or the passage of a predetermined time.

Figure 2:
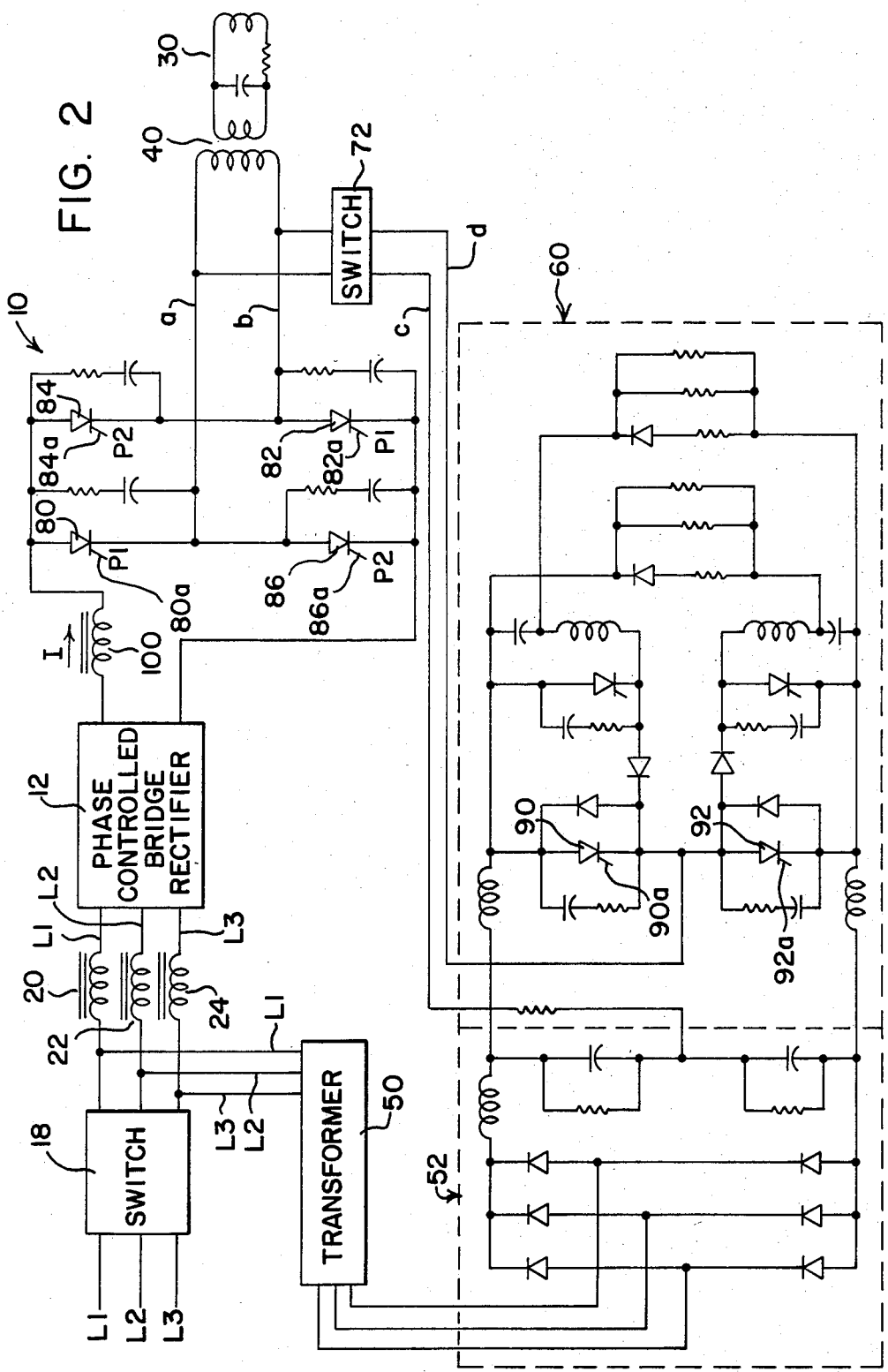
FIG. 2 is a schematic diagram showing the circuit elements in a preferred embodiment of the present invention.

As can be seen in FIG. 2, power inverter 10 is comprised of a bridge inverter circuit having two separate paths P1 and P2, Path P1 having SCR's 80 and 82 and Path P2 having SCR's 84 and 86. The condition of the SCR's is controlled by a gating scheme which individually gates each of the SCR's 80–86 in accordance with a desired control scheme by supplying gating signals to gates 80a, 82a, 84a and 86a of the respective SCR's. This SCR control is well known in the art and does not form a part of this invention.

As described thus far, the preferred embodiment of applicant's invention is generally in accordance with U.S. Pat. No. 4,511,596. Accordingly, starting inverter 60 may be comprised of only two SCR's 90 and 92. These SCR's are also controlled by standard gating logic applied to SCR's at gates 90a and 92a. The components of starting inverter 60 are proportioned to drive the load to about 10 to 15 percent of the output rated value of parallel compensated power inverter 10. The inverter 60 is thus easier to start than the inverter 10 and can be positively driven to the resonant frequency of the load 30 starting this level. Sufficient energy is provided in the load to commutate SCR's 80–86 of the main inverter 10 to initiate operations of this inverter. In practice, inverter 10 may have a rating of approximately 200 kilowatts and the starting inverter 60 is sized at approximately 20 to 30 kilowatts.

In accordance with another aspect of the invention, a D.C. choke 100 is provided between the phase control bridge rectifier 14 and the parallel compensated inverter 10. D.C. choke 100 has a value of approximately 5.3 millihenries. The addition of this choke increases the system Q, as seen by the inverter, to a value of greater than about 6, as will be described hereinbelow.

Figure 3:
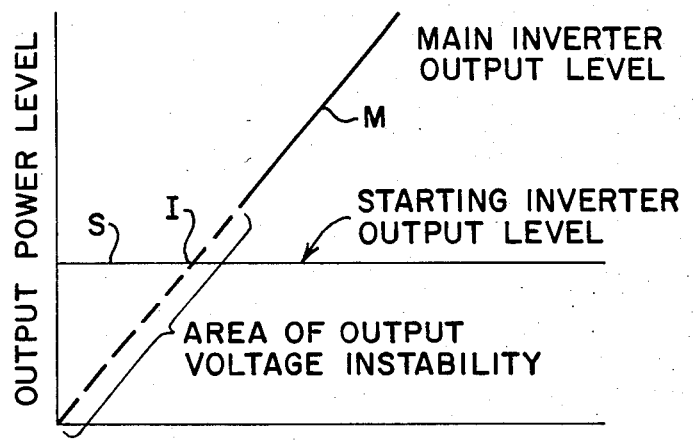
FIG. 3 is a graph demonstrating the operational characteristics of prior art starting inverters.
Figure 4:
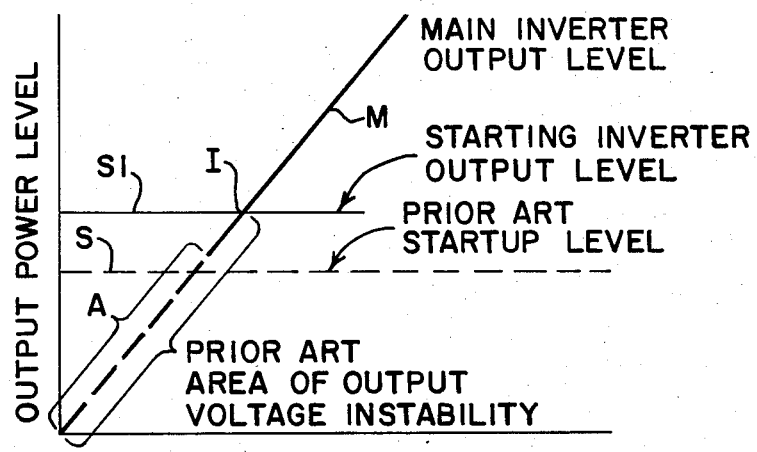
FIG. 4 is a graph showing a comparison of the present invention with the prior art.

Referring now to FIGS. 3 and 4, which demonstrate the operation of the present invention, FIG. 3 demonstrates the operational characteristics of the prior art. In this graph, it can be seen that the output level of the main inverter increases steadily during start-up as shown by curve M. The lower portion of this curve indicates an area of output voltage instability. If the main inverter is applied across the load at this output level, there is a likelihood that commutation will fail. If the point I on the curve M, the point where the starting inverter output level curve S intersects with the main inverter output level curve M is in the area of instability, as shown in FIG. 3, there is a likelihood that the inverter will fail to commutate.

FIG. 4 shows the characteristics of the present invention in comparison with the prior art. In accordance with applicant's invention, output level S1 of the starting inverter 60 has been increased from a range of about 5% of the rated power level to the power inverter 10 to about 10-15% of the rated power level. This raises the starting inverter curve S1, and the intersection point I upwardly with respect to the main inverter curve M. At the same time, the size of the D.C. choke 100 is increased to a value of about approximately 5.3 millihenries, thereby decreasing the area of voltage instability in the main inverter curve M, as indicated by the bracketed portion A of the main inverter curve M. The combination of the decrease in the area of voltage instability and the increase in the starting inverter output level places the intersection of the starting inverter curve S, and main inverter curve M in the solid area of the curve M. Thus, at the point at which the operation of the inverter converts from starting mode to steady-state operation, the main inverter is in a stable operating area. This ensures commutation of the main inverter.

Referring now to FIG. 5, a plot of the output level of instability is shown against increasing values of D.C. choke 100. As I (100) XL, the value of the input current multiplied by the reactance value XL (D.C. choke 100) increases, the level of output instability decreases along the curve M2 as shown. When an instability level value is reached that is lower than the output voltage of the starting inverter, or when I (100) XL is approximately equal to C on the graph, a level of instability is reached which is sufficiently low to enable reliable start-up of inverter 30 under a wide variety of conditions.

As previously discussed, while a very large increase in the value of D.C. choke 100 will accomplish the desired increase in the system Q to bring the output level of instability to an acceptable value, it is desirable to use as small an inductance as possible, consistent with the need to start the power inverter without failure. Accordingly, FIG. 5 demonstrates a satisfactory relationship of the level of output instability to the starting inverter output voltage. As shown, point A indicates the intersection of the output level of instability curve M2 with the starting inverter curve. Point B, the value of the curve M2 when I (100) times XL equals C, represents a satisfactory accommodation to the above-defined need. Accordingly, it is desirable to have B/A, the ratio of these two values, to be in the range of approximately about 0.9 to 1.0. Falling in this range, the D.C. choke is a suitable size to prevent instability of the power inverter, while being as small as possible consistent with the need to economize in the construction of these components.

It will be appreciated that the present invention is described in connection with a structural embodiment; however, various changes may be made in this embodiment without departing from the intended spirit and scope of the present invention.

Having thus described the invention, it is claimed:

1. In a power inverter for converting direct current from a constant current supply into alternating current, for use in applications requiring frequent energizations of serial loads having varying Q characteristics, said power inverter including a starter inverter providing initial energization of each said load, said starting inverter having a direct current input from said supply and an alternating current output which may be selectively applied across each load, means responsive to an energization level of said load to remove said starting inverter from said load when a preselected energization level is reached, and means to energize said power inverter in timed relationship with the removal of said starting inverter with said load, said power inverter having an output voltage level below which there is starting instability, the improvement comprising:
    means in said power inverter for increasing the apparent Q of the load to be energized, whereby the voltage level of output instability of the power inverter is substantially reduced to a lower output voltage; and,
    means providing an output voltage at said starting inverter at least as high as said lower output voltage, whereby commutation failure of said power inverter is precluded.

2. The improvement as defined in claim 1, wherein said means increasing said apparent Q includes a D.C. choke between said power inverter and said constant current power supply.

3. The improvement as defined in claim 2 wherein said D.C. choke has an induction value of approximately 5.3 millihenries.

4. The improvement as defined in claim 2 wherein said apparent Q of the load is increased by said D.C. choke to about 6.

5. The improvement as defined in claim 1 wherein said starting inverter energization level is approximately about 10 to 15 percent of the power inverter energization level.

6. A method of operating a power inverter to reduce commutation failure in operation, the inverter of the type used in induction heat treating of sequential loads, having a constant current power supply and a starting inverter removably connectable across each load to initiate energization thereof until a preselected energization value is achieved whereupon said power inverter is energized and said starting inverter is removed from said load, said power inverter having an output voltage level below which there is starting instability, said method comprising the steps of:
    (a) reducing the output voltage of starting instability to a new output voltage by increasing the apparent Q of the load; and,
    (b) providing a voltage energization level of said starting inverter at least as great as the new output voltage of starting instability in said power inverter.

7. The method as defined in claim 6 wherein said output voltage instability is reduced by providing a D.C. choke between said power inverter and said constant current power supply.

8. A method as defined in claim 7 wherein said D.C. choke is provided with an induction value of approximately 5.3 millihenries.

9. The method as defined in claim 8 wherein said preselected energization value is approximately about 10 to 15 percent of the power inverter energization level.

10. A method of operating a current source power inverter to prevent starting instability when used to provide power for heating cycles of an induction heating load, said inverter having a constant current power supply input and a small starting inverter with an output voltage removably connectable across the output of said power inverter during each heating cycle whereby said power inverter has an output voltage level below which there is starting instability and whereby said output voltage of said starting inverter is less than said instability voltage level of said power inverter, said method comprising increasing the inductance at the constant current input by an amount sufficient to reduce said instability output voltage level to a voltage only slightly below output voltage of said small starting inverter whereby the size of said inductance is minimized.

11. A method as defined in claim 10 wherein said inductance amount is sufficient to reduce said instability output voltage level less than 10% below said output voltage of said small inverter.

* * * * *